United States Patent [19]

Strayer et al.

[11] Patent Number: 4,814,728

[45] Date of Patent: Mar. 21, 1989

[54] ULTRA-STABLE SUPERCONDUCTING CAVITY MASER OSCILLATOR

[75] Inventors: Donald M. Strayer; Dick: G. John, both of Pasadena, Calif.

[73] Assignee: California Institute of Technology, Pasadena, Calif.

[21] Appl. No.: 109,412

[22] Filed: Oct. 19, 1987

[51] Int. Cl.$^4$ ............................................. H01S 1/02
[52] U.S. Cl. ................................. 331/94.1; 330/4
[58] Field of Search .................. 331/3, 94.1; 330/4

[56] References Cited

PUBLICATIONS

Smirnova et al., "A 4-cm Band Ruby Maser", Radio Eng. & Electron, Phys. vol. 18, No. 2, Feb. 1973, pp. 258–261.
Stetsenko, "Masing in Ruby in Strong Magnetic Fields", Sov. Tech. Phys. Lett. vol. 6, No. 1, Jan. 1981, pp. 45–46.

Primary Examiner—Siegfried H. Grimm
Attorney, Agent, or Firm—Ashen Golant Martin & Seldon

[57] ABSTRACT

An ultra-stable superconducting triple cavity ruby maser oscillator (10) is obtained by providing the oscillator with a superconducting quantum interference device (SQUID) (50), which measures the magnetic field at the ruby (14) and compensates for changes by adjusting the RF pump signal amplitude (42), thereby attaining stabilities of about four orders of magnitude greater than presently attainable.

19 Claims, 2 Drawing Sheets

ULTRA-STABLE SUPERCONDUCTING CAVITY MASER OSCILLATOR

The invention described herein was made in the performance of work under a NASA contract, and is subject to the provisions of Public Law 96-517 (35 USC 202) in which the contractor has elected to retain title.

TECHNICAL FIELD

The present invention relates to cavity maser oscillators, and, in particular, to means for attaining stabilities greater than presently attainable.

BACKGROUND ART

Existing ruby maser oscillators employ three cavities, all held at the same very low temperature. This system is stabilized by a high-Q superconductor coated sapphire resonant cavity. Such oscillators are capable of frequency stabilities approaching $10^{-16}$, as characterized by the Allan variance of repeated frequency measurements. The Allan variance is found by repeatedly measuring the frequency, then finding the differences from previous measurements, and calculating the variance of the differences. These are then normalized by dividing by the oscillator frequency itself.

The ruby maser is the active electronic element in the oscillator, driving the three-cavity system into electromagnetic oscillation. The natural frequency of operation of the ruby maser is determined by the magnetic field existing at the ruby, biasing the energy levels of the chromium ions in the ruby. The bandwidth of the ruby is about 2% (corresponding to a Q of about 50), a value not sufficiently small enough to generate an ultra-high stability frequency without stabilization by a separate high-Q cavity. While the oscillation frequency is primarily determined by the high-Q stabilizing cavity, it also responds to the tuning of the maser. This takes place as follows:

Stabilized oscillation occurs at a frequency within bandwidths of both the ruby maser and the high-Q mode of the three-cavity electromagnetic resonator system. The actual oscillation frequency is determined primarily by that of the high-Q stabilizing resonator, but is also determined to a lesser extent by the maser. Specifically, if the maser's frequency varies by a certain amount, the oscillation frequency varies by this amount multiplied by the ratio of the maser Q (about 50) divided by the Q of the high-Q mode of the resonator (about $5 \times 10^8$).

The magnetic field seen by the ruby is the sum of two components: the very stable external field applied by the superconducting magnet and "locked into" a superconducting cylinder surrounding the ruby, and an internal field caused by the polarization of the magnetic moments of the chromium ions. To make the ruby-biasing applied steady magnetic field be unvarying, the magnetic field is "locked into" a surrounding superconducting cylinder by causing the cylinder to pass into the superconducting state, by cooling it through the transition temperature, in the correct value of the applied magnetic field. This effectively isolates the ruby from external field changes, but not, of course, from its own magnetic polarization.

As the chromium ions change their occupation of the allowed energy states, the polarization field changes in magnitude. Each energy state corresponds to a different alignment of the magnetic moment of the chromium ion in the local magnetic field. Therefore, when a chromium ion changes its energy state, its contribution to the total polarization field also changes.

To produce the negative resistance that provides the amplifying action of the ruby maser, both a steady magnetic field and a radio frequency (RF) electromagnetic field (the RF pump signal) are applied to the ruby. When the frequency $\nu$ of the pump signal matches the separation of a pair of energy states, $E_i$ and $E_j$, of a chromium ion, $E_j - E_i = h\nu$, where h is Planck's constant, the pump signal can cause the ion to undergo a transition to the other state. Under the proper circumstances, this action can be used to create an ion population in a higher energy level that is larger than the population in a lower level, thereby obtaining the capability to amplify a signal—as the high energy ions change downwards to the lower energy state, they release energy, thus acting as a negative resistance. But the action of stimulating transitions also changes the alignment of the ions' magnetic moments, and so changes the polarization field in the ruby.

Amplitude fluctuations in the pump signal leads to fluctuations in the polarization magnetic field in the ruby. This has been demonstrated in a device designed to detect low frequency modulation of a microwave signal by the use of a ruby maser; see I.A. Deryugin et al, "Signal Detection in a Maser", Radio Engineering and Electronic Physics, Vol. 17, pp. 270–271 (February 1972) (translated from Raadiotekhnika i Elektronika, Vol. 17, pp. 353–353 (February 1972)). In this experiment, the change in polarization field was sensed by means of a pick-up coil placed around the ruby maser and the low frequency electrical signal generated by the pick-up coil was then sensed by external electronics. In this way, the AC modulation of the microwave signal was detected.

Since the polarization field affects the operating frequency of the ruby maser, polarization fluctuations cause frequency fluctuations in the maser, and thus in the oscillator system. For a given circumstance of oscillator operation, a definite relation can be derived for the magnitude of oscillator frequency fluctuation resulting from the pump signal amplitude fluctuation of a specific size.

To obtain stable operation, this source of fluctuations must be reduced to acceptable levels. The common technique is to operate a power detector and an electronically variable attenuator in the signal transmission line. Variations in signal power are compensated for by responsively increasing or decreasing the attenuation. However, this technique cannot reduce the pump signal fluctuations sufficiently to allow oscillator stabilities better than about $10^{-16}$, using conventional power detectors and attenuators. Furthermore, these conventional components must operate at room temperature, whereas the amplitude that needs stabilization is that arriving at the ruby, at low temperature. Fluctuations in signal amplitude caused by changes in signal passage through the transmission line beyond the power detector will not be compensated.

DISCLOSURE OF INVENTION

In accordance with the invention, the magnetic field at the ruby maser is monitored and variations are compensated for by changing the amplitude of the pump signal. Thus, the polarization field fluctuations will be measured directly and compensated. In a preferred embodiment, equipment to carry out measurement and compensation also operates at the low temperature of oscillator operation and in close physical proximity to the oscillator.

The invention is suitably employed to provide stabilization of oscillators comprising the high-Q cavity and a maser comprising a regenerator material, such as ruby. The high-Q cavity may comprise a superconducting or a dielectric resonator. An example of the former resonator is an electromagnetic resonator comprising a crystal, such as sapphire, coated with a superconducting material, such as lead.

In one embodiment, an ultra-stable superconducting triple cavity ruby maser oscillator is obtained by providing the oscillator with a superconducting quantum interference device (SQUID) which measures the magnetic field at the ruby and compensates for changes by modulating pump signal amplitude, thereby attaining stabilities of about four orders of magnitude greater than presently attainable.

The SQUID is an instrument that is ideally suited for the desired measurements. This device is both very sensitive to magnetic fields and extremely stable. In addition, it operates well at low temperature.

BEST MODES OF CARRYING OUT THE INVENTION

Figure 1:
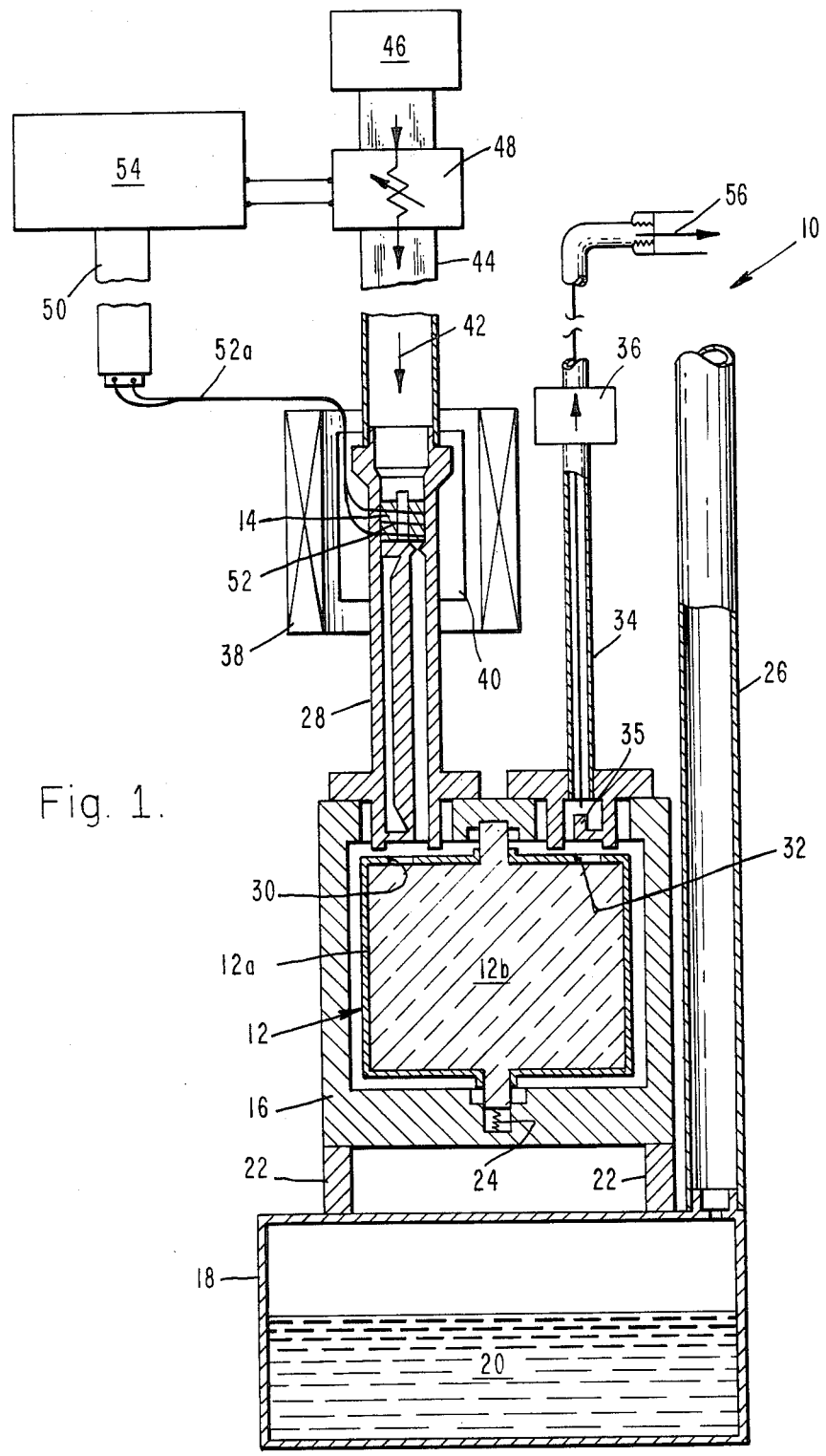
FIG. 1 is a schematic diagram of an ultra stable superconducting cavity maser oscillator in accordance with the invention.

FIG. 1 depicts the simplest scheme for implementing the stabilization of the invention. As is well-known, oscillator 10 includes a superconducting resonant cavity 12 and a ruby maser 14. The resonator 12 is formed by depositing a lead (Pb) film 12a onto a shaped sapphire substrate 12b. Other embodiments of the resonator 12 utilize films of other superconductors, especially superconductors having higher transition temperatures, such as niobium (Nb), niobium-tin (Nb$_3$Sn), niobium nitride (NbN) or the oxide superconductors such as barium-yttrium-copper oxide (Ba$_2$YCu$_3$-O$_7$). The teachings of this invention are also applicable to other configurations, such as uncoated dielectric resonators, e.g., uncoated sapphire, with suitable modifications that would be apparent to those skilled in this art.

The lead film 12a is superconducting at the operating temperature of the cavity 12. An example of the measured quality factor Q for such a cavity 12 is $2.3 \times 10^9$ at a temperature of 1.6 Kelvin and at the cavity's resonant frequency of 2.69 GHz. The sapphire substrate 12b reduces response of the cavity frequency to temperature, tilt, and vibration disturbances.

The resonator 12 is maintained in a containing can 16 and is mechanically isolated from the containing can by a support spring 24. The containing can 16 is thermally connected to the helium-containing pot 18 by means of a thermal anchor 22. An outlet means 26 permits exhaustion of helium gas as liquid helium 20 boils off. Liquid helium is added as needed by a fill tube (not shown). Electronic temperature regulation elements (not shown) regulate the temperature of the sapphire resonator 12.

The ruby maser 14 is coupled to the cavity 12 by means of a coupling resonator 28 through a coupling orifice 30. Coupling is effected by RF fields emanating from the orifice 30, interacting with the shorted end of the resonator 28.

The oscillator signal is extracted from the second coupling orifice 32 via a coaxial cable conductor 34. Pick-up resonator 35 is inductively coupled to the fields emanating from the orifice 32 and capacitively coupled to the bottom end of the pick-up coaxial cable 34. A unidirectional isolator 36 is installed in the coaxial cable 34 at low temperature to prevent the passage of disturbances from room temperature electronics back into the cooled oscillator.

The ruby maser 14 requires that a magnetic field be applied, such as by superconducting solenoid 38, to bias the chromium ion energy levels to the correct splitting. A superconducting cylinder 40 stabilizes the magnetic field generated by the solenoid 38 and in addition shields the ruby maser 14 during operation against changes in external fields.

The superconducting film 12a of the stabilizing cavity 12 would have its Q degraded if it were subjected to the 500 Gauss field of the maser 14. A third cavity (the coupling resonator 28) is therefore used to displace the superconducting cavity 12 away from the high field region 38, and superconducting shields (not shown) between the solenoid 38 and the superconducting cavity are placed to further reduce the magnetic field at the high-Q cavity. The three-cavity system 10 is cooled below 1.0 Kelvin by pumping on the pot 18 of $^4$He, the whole cooled region (that portion of the apparatus shown below the breaks) being in an isolation vacuum surrounded by a bath of liquid helium at atmospheric pressure.

The ruby maser 14 is excited by a pump signal 42 coupled thereto by a single mode waveguide 44, for example, a rectangular TE$_{01}$ waveguide. The waveguide 44 transmits the signal 42 from a signal generator 46 via an electronically variable attenuator 48.

The rather large response of the oscillator frequency to the amplitude of the pump signal 42 has been noted above. This pulling is now understood to result from the influence that the pump signal 42 has on polarization of the chromium ions in the ruby 14. The coefficient of $2.5 \times 10^{-12}$ per decibel of pump amplitude, measured for a conventional oscillator, implies the need to stabilize the amplitude to 0.004 decibel to obtain $10^{-15}$ frequency stability, a requirement achievable by ordinary stabilization schemes. Obtaining $10^{-17}$ frequency stabilization would require some less conventional amplitude stabilization method.

In accordance with the invention, amplitude stabilization is achieved by coupling the input of a SQUID magnetometer 50 to the ruby resonator 14 by means of a pick-up coil 52, which is wound around ruby crystal 14. The pick-up coil 52 comprises superconducting wire, such as niobium or niobium-titanium. The leads 52a (also superconducting) of the pick-up coil 52 are connected to the input of the SQUID magnetometer 50. An example of a suitable SQUID magnetometer is available from Biomagnetics Technology Inc., (San Diego, CA), under the designation Model BMS. The impedance of the pick-up coil 52 is matched to that of the SQUID's input circuits, shown at 54, by adjusting the number of turns in the coil to provide the matching impedance.

Changes in the magnetic field inside the coil 52 induce currents that are fed to the magnetometer 50, which cause a change in the SQUID output electronics 54. The SQUID output 54 controls the attenuation of the electronically-controlled attenuator 48 to responsively vary the pump signal amplitude, shown at 42, for compensation. A very high feedback loop gain is employed, for sensitivity of control and compensation. For example, using an integrator, a gain of about 1,000 to 30,000 is achieved for amplitude fluctuations over 1,000 sec.

A pump signal 42 of 13.1 GHz is supplied to the ruby resonator 14, the amplitude of which is stabilized in accordance with the invention to provide an ultra stabilized output signal at 56 of 2.7 GHz. That is to say, a high frequency, highly stabilized signal.

Figure 2:
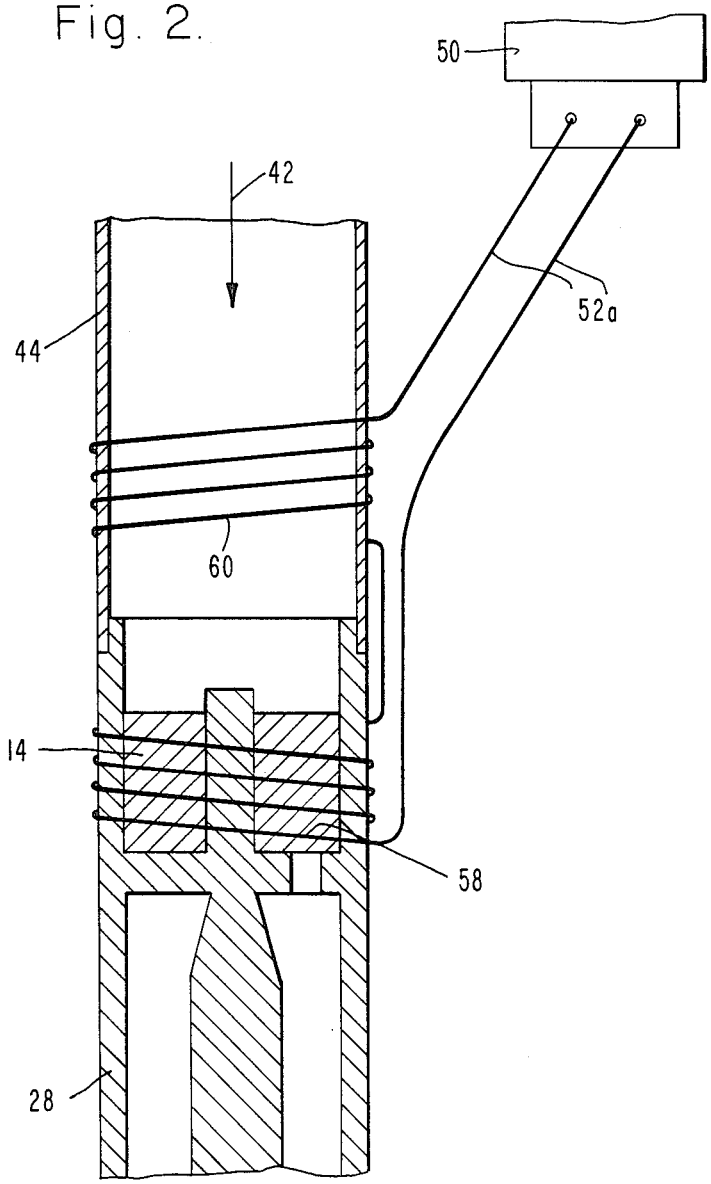
FIG. 2 is an enlarged fragmentary portion of FIG. 1, depicting an alternative embodiment.

A slightly different embodiment may be employed to obtain high sensitivity to magnetic field changes, while operating the pick-up coil 52 in the rather large external magnetic fields applied by the superconducting solenoid coil 38. In this embodiment, shown in FIG. 2, there are two pick-up coils 58, 60, wound in opposing sense, such that if there is no difference in the fields sensed by the two coils, no net current is induced. One coil 58 is wound around the ruby 14, while the other 60 is axially displaced from the ruby. Thus, the first coil 58 will have currents induced as a result of fluctuations in polarization within the ruby 14, and these will cause changes in the output of the SQUID 50, as in the first embodiment described above.

The typical sensitivity of the conventional commercially-available SQUID magnetometer 50 should be sufficient to reduce frequency fluctuations caused by pump signal amplitude changes to $2 \times 10^{-19}$, when operated with an oscillator 10 having a mode quality factor (Q) of $10^9$. Since superconducting cavity oscillators have exhibited Q's as large as $2 \times 10^{10}$, then oscillator fluctuations caused by pump signal variations can be reduced down to the $10^{-20}$ level.

INDUSTRIAL APPLICABILITY

The ultra-stable superconducting cavity maser oscillator of the invention is expected to find use as a potential replacement for the hydrogen maser in space navigation and in radio astronomy applications.

Thus, there has been disclosed an ultra-stable superconducting cavity maser oscillator, achieved by coupling a superconducting quantum interference device to a ruby resonator to detect variations in magnetic polarization fields in the ruby caused by fluctuations in the amplitude of an RF pump signal applied to the ruby. The detected variations are used to regulate the incoming signal to the ruby and thus produce an ultrastable output signal.

It will be appreciated by those skilled in this art that various changes and modifications of an obvious nature may be made, and all such changes and modifications are deemed to fall within the scope of the invention, as defined by the appended claims.

What is claimed is:

1. An improved oscillator (10) comprising a high-Q cavity (12) and a maser (14) comprising a regenerator material in a stabilized magnetic field applied thereto and pumped by an attenuated signal (42), the improvement comprising means (50) for monitoring the magnetic field at the regenerator material and for compensating for variations in amplitude in said pump signal by sensing resulting changes in said magnetic field and changing said amplitude of said pump signal.

2. The oscillator of claim 1 wherein said high-Q cavity comprises an electromagnetic resonator comprising a crystal (12b) coated with a superconducting material (12a) in a containing can (16) cooled to a temperature below the transition temperature of said superconducting material.

3. The oscillator of claim 2 wherein said electromagnetic resonator comprises sapphire coated with lead.

4. The oscillator of claim 1 wherein said maser comprises a ruby regenerator maintained in a magnetic field.

5. The oscillator of claim 4 wherein said ruby regenerator is maintained in a magnetic field supplied by a superconducting solenoid (38) and stabilized by a superconducting cylinder (40).

6. The oscillator of claim 1 wherein said monitoring means comprises a superconducting quantum interference device comprising a magnetometer for measuring magnetic fields surrounding said maser, resulting in an output signal that controls said pump signal by adjusting the attenuation thereof.

7. An improved oscillator (10) comprising a superconducting cavity (12) comprising an electromagnetic resonator comprising a crystal (12b) coated with a superconducting material (12a) in a containing can (16) cooled to a temperature below the transition temperature of said superconducting material and a maser (14) comprising a ruby regenerator material in a magnetic field applied thereto by superconducting solenoids (38) and excited by a radio frequency pump signal (42), the improvement comprising a superconducting quantum interference device (50) for monitoring the magnetic field at said ruby resonator and for compensating for variations in the amplitude in said pump signal by sensing resulting changes in magnetic field and changing the amplitude of said pump signal.

8. The oscillator of claim 7 wherein said electromagnetic resonator comprises sapphire coated with lead.

9. The oscillator of claim 7 wherein said superconducting quantum interference device comprises a magnetometer for monitoring magnetic fields surrounding said maser, resulting in an output signal that controls said pump signal by attenuation thereof.

10. The oscillator of claim 9 wherein said device is provided with an input signal from pick-up coils (52) operatively associated with said maser.

11. The oscillator of claim 10 wherein said pick-up coils comprise a pair of coils, one (58) surrounding said ruby maser and one (60) axially displaced therefrom, connected in series with the input to said device.

12. A method for stabilizing the amplitude of an attenuated pump signal fed to a maser comprising a regenerator material in a magnetic field applied thereto and coupled to a high-Q cavity, said method comprising monitoring the magnetic field at the regenerator material and compensating for variations in amplitude in said pump signal by sensing resulting changes in said magnetic field and changing said amplitude of said pump signal.

13. The method of claim 12 wherein said high-Q cavity comprises an electromagnetic resonator comprising a crystal coated with a superconducting material in a containing can cooled to a temperature below the transition temperature of said superconducting material.

14. The method of claim 12 wherein a superconducting quantum interference device comprising a magnetometer monitors said magnetic field at said generator material and compensates for variations in amplitude in said pump signal by sensing resulting changes in said magnetic field and changing said amplitude of said pump signal in response thereto.

15. A method for stabilizing the amplitude of an attenuated pump signal fed to a ruby maser in a magnetic field applied thereto and coupled to a high-Q cavity comprising an electromagnetic resonator, said method comprising monitoring the magnetic field at said ruby maser by a superconducting quantum interference device and compensating for variations in amplitude in said pump signal by sensing resulting changes in said magnetic field and changing said amplitude of said pump signal in response thereto.

16. The method of claim 15 wherein said electromagnetic resonator comprises sapphire coated with lead.

17. The method of claim 15 wherein said superconducting quantum interference device comprises a magnetometer for monitoring magnetic fields surrounding said maser, resulting in an output signal that controls said pump signal by adjusting the attenuation thereof.

18. The method of claim 15 wherein said device is provided with an input signal from pick-up coils operatively associated with said maser.

19. A method for stabilizing the amplitude of an attenuated radio frequency pump signal fed to a ruby maser in a magnetic field applied thereto and coupled to a high-Q cavity comprising an electromagnetic resonator comprising sapphire coated with lead, said method comprising monitoring the magnetic field surrounding said ruby maser by at least one pick-up coil operatively associated with said ruby maser to generate an output signal, routing said output signal to a magnetometer of a superconducting quantum interference device and compensating for variations in amplitude in said pump signal by adjusting the attenuation thereof.

* * * * *